US008024310B2

(12) United States Patent
Zhong et al.

(10) Patent No.: US 8,024,310 B2
(45) Date of Patent: Sep. 20, 2011

(54) INFORMATION PROCESSING APPARATUS AND COMPUTER-READABLE MEDIUM

(75) Inventors: Zhihua Zhong, Tokyo (JP); Tohru Fuse, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 337 days.

(21) Appl. No.: 11/960,868

(22) Filed: Dec. 20, 2007

(65) Prior Publication Data

US 2008/0319979 A1 Dec. 25, 2008

(30) Foreign Application Priority Data

Jun. 25, 2007 (JP) ................................. 2007-166677

(51) Int. Cl.
G06F 17/30 (2006.01)
(52) U.S. Cl. . 707/705; 707/713; 707/781; 707/E17.064; 707/999.005; 707/999.009; 709/217; 709/225; 715/748
(58) Field of Classification Search .................. None
See application file for complete search history.

(56) References Cited

U.S. PATENT DOCUMENTS

| 6,308,199 B1 | 10/2001 | Katsurabayashi | |
|---|---|---|---|
| 6,559,968 B1 * | 5/2003 | Keronen | 358/1.18 |
| 7,432,938 B1 * | 10/2008 | Reuter et al. | 345/619 |
| 7,523,045 B1 * | 4/2009 | Walker et al. | 705/8 |
| 2002/0136382 A1 * | 9/2002 | Cohen et al. | 379/202.01 |
| 2006/0069656 A1 * | 3/2006 | Horikiri | 705/71 |
| 2006/0235793 A1 * | 10/2006 | Walker et al. | 705/40 |
| 2007/0081184 A1 * | 4/2007 | Daos et al. | 358/1.15 |
| 2007/0239844 A1 * | 10/2007 | Yokoyama et al. | 709/217 |

FOREIGN PATENT DOCUMENTS

| JP | 11-65975 A | 3/1999 |
|---|---|---|
| JP | 2006-195668 A | 7/2006 |

* cited by examiner

*Primary Examiner* — Shahid A Alam
*Assistant Examiner* — Andalib F Lodhi
(74) *Attorney, Agent, or Firm* — Sughrue Mion, PLLC (57) ABSTRACT

A computer-readable medium stores a program causing a computer to execute information processing. The information processing includes: reading user information of a user who requests to provide first document information; generating second document information, based on (i) concealment region information associated with the first document information and (ii) the read user information relating to the user; and outputting the second document information. The concealment region information includes (i) information, for specifying a region that is to be concealed when the associated first document information is provided and (ii) concealment condition information used to determine as to whether or not the concealment region is concealed. In the second document information, a region in the first document information that is to be concealed from the user is concealed.

4 Claims, 7 Drawing Sheets

DISPLAY EXAMPLE

US 8,024,310 B2

INFORMATION PROCESSING APPARATUS AND COMPUTER-READABLE MEDIUM

CROSS-REFERENCE TO RELATED APPLICATIONS

This application is based on and claims priority under 35 U.S.C. §119 from Japanese Patent Application No. 2007-166677 filed Jun. 25, 2007.

BACKGROUND

1. Technical Field

The invention relates to an information processing apparatus and a program.

2. Description of the Related Art

There is a technology that enables terminals connected to one another through communication means such as a network to refer to common document information. This technology is useful, for example, when users located on remote sites have a conference or the like together.

SUMMARY

According to an aspect of the invention, an information processing apparatus includes a document information holding unit, a user information holding unit, a concealment region information holding unit, an information reading unit, a generation unit and an output unit. The document information holds unit holds first document information. The user information holding unit holds user information relating to users. The concealment region information holding unit holds at least one piece of concealment region information associated with the held first document information. The concealment region information includes (i) information, for specifying a region that should be concealed when the associated first document information is provided and (ii) concealment condition information used to determine as to whether or not the concealment region should be concealed. The information reading unit reads, from the user information holding unit, user information of a user who requests to provide the first document information. The generation unit generates second document information, based on (i) the concealment region information, which is associated with the first document information and which is held by the concealment region information holding unit, and (ii) the read user information relating to the user. In the second document information, a region in the first document information that should be concealed from the user is concealed. The output unit outputs the second document information.

BRIEF DESCRIPTION OF THE DRAWINGS

Exemplary embodiments of the invention will be described in detail below with reference to the accompanying drawings, wherein.

DETAILED DESCRIPTION OF EXEMPLARY EMBODIMENTS

Figure 1:
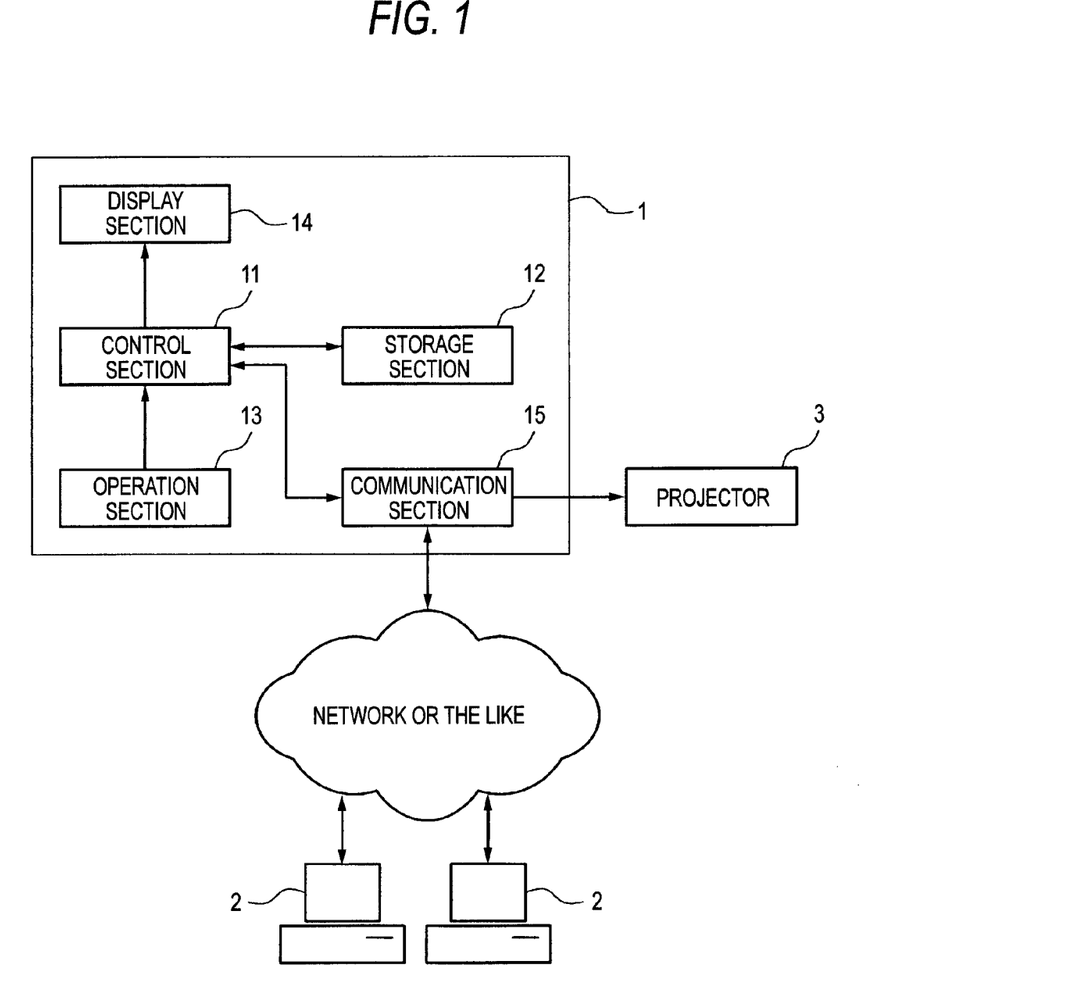
FIG. 1 is a block diagram showing, as an example, the configuration of an information processing apparatus according to an exemplary embodiment of the invention.

Exemplary embodiments of the invention will now be described with reference to the accompanying drawings. An information processing apparatus 1 according to an exemplary embodiment of the invention, as shown in FIG. 1, has a control section 11, a storage section 12, an operation section 13, a display section 14, and a communication section 15. This information processing apparatus 1 is connected to at least one user terminal 2 through a communication unit such as a communication line or a serial interface. Also, the information processing apparatus 1 may be connected to a projector 3.

The control section 11 may be implemented by a microprocessor or the like, and operates in accordance with a program stored in the storage section 12. Upon receipt of a command input by a user (hereinafter, referred to as a provider-side user so as to be distinguished from a terminal-side user) of the information processing apparatus 1, the control section 11 transmits an image of document information designated by the provider-side user to the user terminals 2. The user terminals 2 display the transmitted image. The control section 11 according to this exemplary embodiment generates images that may be different for respective user terminals 2 that are recipients, and transmits the generated images. Detailed process of the control section 11 will be described later.

The storage section 12 includes a memory device such as a RAM (Random Access Memory) or a ROM (Read Only Memory), a disk device such as a hard disk, or the like. This storage section 12 stores the program to be executed by the control section 11. Also, this storage section 12 operates as a work memory of the control section 11. In addition, the storage section 12 according to this exemplary embodiment holds document information such as a presentation material. Furthermore, the storage section 12 holds concealment region information in association with the held document information. The concealment region information includes (i) information for specifying a region that is to be concealed when the document information is provided and (ii) concealment condition information indicating a condition used to determine as to whether or not the region is to be concealed. The respective information stored in the storage section 12 will be described in detail later. The program stored in the storage section 12 may be provided with being, for example, stored in a computer-readable medium such as a DVD-ROM, and then the program may be copied into the storage section 12.

The operation section 13 is an input device such as a mouse and/or a keyboard. This operation section 13 outputs a command operation performed by the user, to the control section 11. The display section 14 has a display D and displays information on the display D for the user in accordance with a command input from the control section 11. Also, the display section 14, for example, may have an output port for connection with the projector 3. In such a case, the display section 14 may output the same information as is displayed on the display D, through the output port to the projector 3 or output information different from that displayed on the display D, to the projector 3 through the output port.

The communication section 15, for example, is a network interface and is connected to the user terminals 2 through the network that is an example of the communication unit. The communication section 15 according to this exemplary embodiment receives (i) image data representing document information and (ii) information (for example, information of a network address) for designating a recipient, from the control section 11. Then, the communication section 15 transmits the received image data to the user terminals 2, which is designated as the recipient. Also, the communication section 15 receives information such as an authentication request from the user terminals 2 and outputs the received information to the control section 11.

Figure 2:
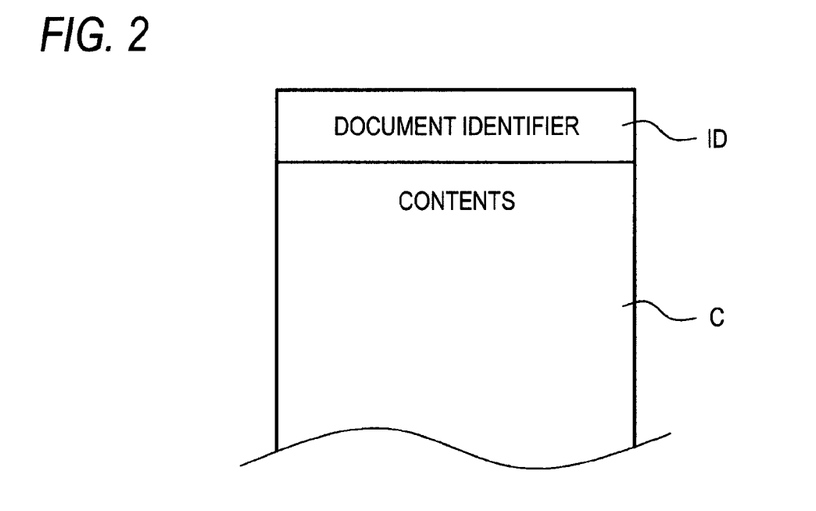
FIG. 2 is a diagram showing an example of document information held by the information processing apparatus according to the exemplary embodiment of the invention.
Figure 3:
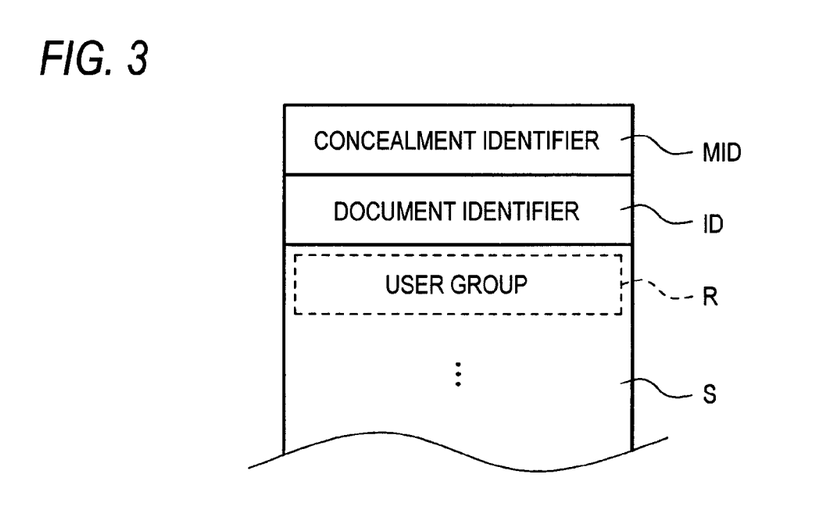
FIG. 3 is a diagram showing an example of concealment region basic information held by the information processing apparatus according to the exemplary embodiment of the invention.
Figure 4:
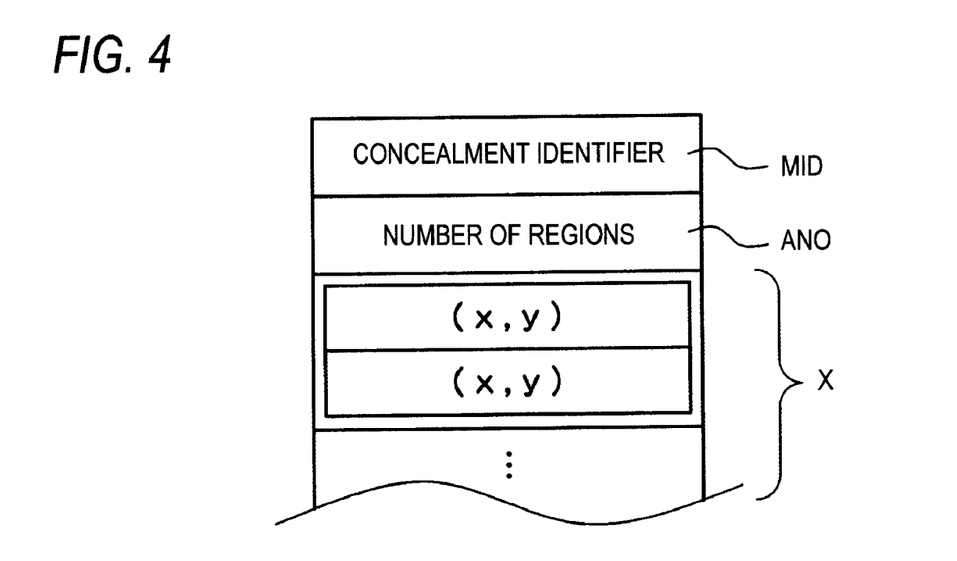
FIG. 4 is a diagram showing an example of concealment region specification information held by the information processing apparatus according to the exemplary embodiment of the invention.

In this exemplary embodiment, the document information, as shown in FIG. 2, includes a document identifier ID and information C representing contents of the document. Also, the storage section 12 stores information including, as shown in FIG. 3, (i) a concealment identifier MID, (ii) a document identifier ID of document information associated with the concealment region information, and (iii) setting information S relating to a concealment process, as concealment region basic information. In addition, the storage section 12 stores information associating, as shown in FIG. 4, (i) the concealment identifier MID, (ii) the number of parts to be concealed ANO, and (iii) plural pieces of coordinate information X specifying a certain rectangular region that is each part to be concealed, as information (concealment region specification information) for specifying a concealment region.

Figure 5:
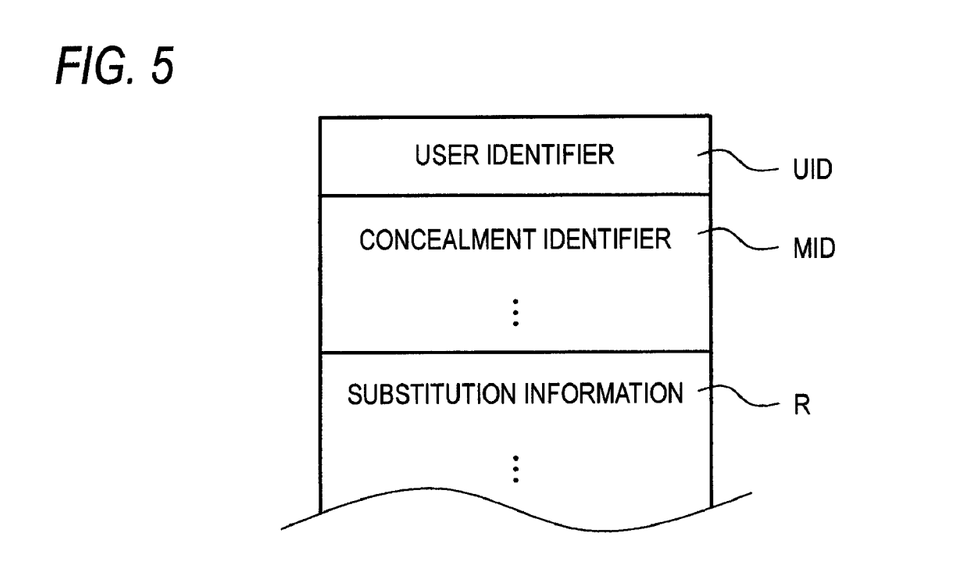
FIG. 5 is a diagram showing an example of user access information held by the information processing apparatus according to the exemplary embodiment of the invention.

In addition, in this exemplary embodiment, the storage section 12 stores user access privilege information (FIG. 5) for each user of the user terminal 2. The user access privilege of each user includes (i) a user identifier UID, (ii) a concealment identifier MID of a region to be concealed from each user, and (iii) substitution information R for specifying information to be displayed in the concealed region.

The concealment region basic information, the user access privilege information indicating which region should be concealed from each user, and the information for specifying the concealment region are associated with each other through the concealment identifier MID, and serve as the concealment region information as a whole.

In this exemplary embodiment, the control section 11 receives user's authentication requests from the user terminals 2 and authenticates users who use the respective user terminals 2 in advance. The authentication process, for example, may be performed by receiving a user name and a password and authenticating each user if the input user name/password are identical to user name/password that are set in advance (for example, stored in the storage section 12).

Figure 6:
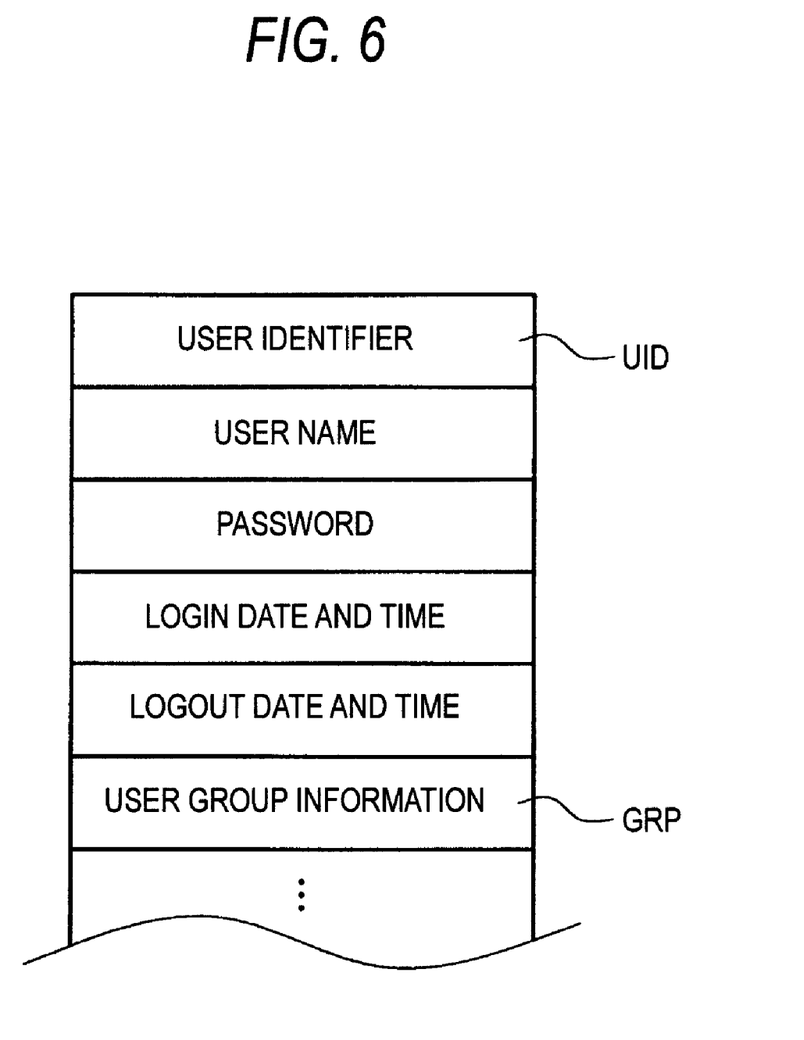
FIG. 6 is a diagram showing an example of user profile information held by the information processing apparatus according to the exemplary embodiment of the invention.

In other words, in this exemplary embodiment, the storage section 12 stores user profile information shown in FIG. 6. The user profile information includes a user identifier UID, user name information, a password, date and time of the latest authentication (login time), date and time of completion of the latest access (logout time), and information GRP indicating a group (for example, a division in a company) to which the user belongs. In the example described below, it is assumed that the setting information S of the concealment region basic information (see FIG. 3) is configured to include information R relating to a users group from which the concealment region represented by the concealment identifier MID of the concealment region basic information should be concealed.

Whenever authenticating a user, the control section 11 adds a user identifier (UID) of the authenticated user to a list, and holds the list in the storage section 12 as information for specifying transmission destinations. The control section 11 receives, from the provider-side user, a command for starting to provide document information and then, starts a process shown in FIG. 7. The control section 11 reads document information to be provided from the storage section 12 in accordance with a command from the provider-side user (S1).

Figure 7:
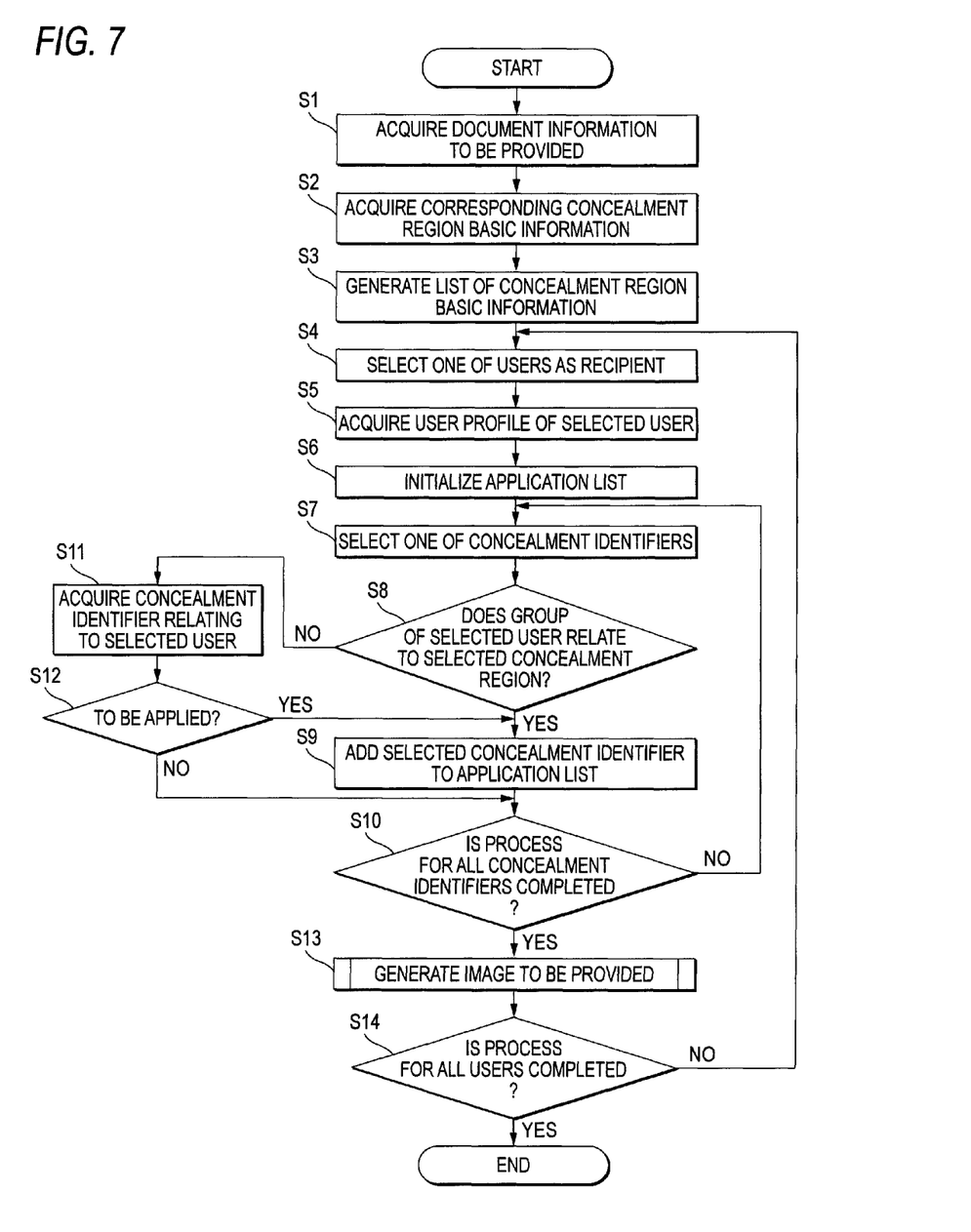
FIG. 7 is a flowchart showing an example of an operation of the information processing apparatus according to the exemplary embodiment of the invention.

Also, the control section 11 refers to a document identifier ID of the document information and reads concealment region basic information including this document identifier from the storage section 12 (S2). Then, the control section 11 acquires a list of the read concealment region basic information (S3). Accordingly, concealment regions that may be set for the designated document information are determined.

The control section 11 continues the following process with reference to the list (recipient list) of the user identifiers of the authenticated users. In other words, the control section 11 selects one user identifier from the recipient list (S4). Then, the control section 11 acquires information of a group to which the user specified by the selected user identifier belongs with reference to the user profile information (S5). Also, the control section 11 initializes a list (application list) of the concealment identifiers that specifies concealment regions to be concealed from the user specified by the selected user identifier (S6).

Then, the control section 11 sequentially selects the concealment region basic information included in the list acquired in the process S3 (S7), and performs the following process. The control section 11 checks as to whether or not the selected concealment region basic information (the information R relating to the user group; see FIG. 3) includes the information of the group acquired in the process S5 (S8).

Here, if the selected concealment region basic information (the information R relating to the user group) includes the information of the group acquired in the process S5, the control section 11 acquires the concealment identifier of the selected concealment region information and adds the concealment identifier to the application list (S9). The control section 11 checks as to whether or not the process for all the concealment region basic information included in the list acquired in the process S3 is completed (S10). If the process for all the concealment region basic information has not been completed, the control section 11 proceeds back to the process S7, and the control section 11 selects the concealment region basic information that has not been selected and continues the process.

On the other hand, in the process S8, if the control section 11 determines in the process S8 that the concealment region basic information (the information R relating to the user group) selected does not include the information of the group acquired in the process S5, the control section 11 acquires the concealment identifier(s) MID associated with the selected user identifier with reference to the user access privilege information (S11). Then, the control section 11 checks as to whether or not the concealment identifier of the concealment region basic information selected in the process S7 is included in the concealment identifier(s) acquired here (S12). If the concealment identifier of the concealment region basic information selected in the process S7 is included in the concealment identifier acquired in the process S11, the control section 11 proceeds to the process S9, and adds the concealment identifier to the application list.

On the other hand, in the process S12, if the concealment identifier of the concealment region basic information selected in the process S7 is not included in the concealment identifier(s) acquired in the process S11, the control section 11 proceeds to the process S10 and continues the process.

If the process for all the concealment region basic information has been completed in the process S10, the control section 11 generates an image to be provided with reference to the application list (S13). This process will be described later. The control section 11 checks as to whether or not images to be provided have been provided for all the users included in the information for specifying the transmission destinations (S14). If there remains a user to whom the image has not been provided, the control section 11 proceeds back to the process S4. Then, the control section 11 selects a user identifier of the user to whom the image has not been provided, and repeats the process. On the other hand, in the process S14, if there is no user to whom the image has not been provided, the control section 11 completes the process.

Figure 8:
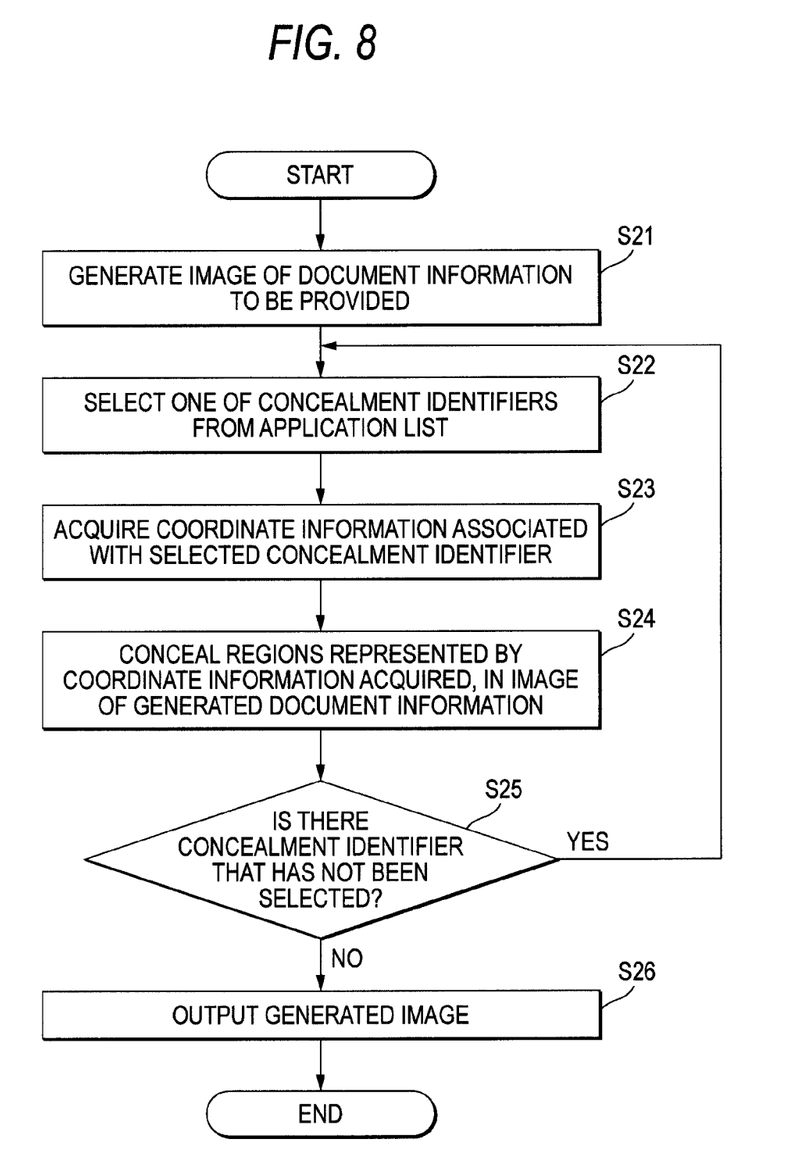
FIG. 8 is a flowchart showing an example of a generation process of an image to be provided by the information processing apparatus according to the exemplary embodiment of the invention.

Next, the process of generating an image to be provided will be described. The control section 11 performs the following process with reference to the application list generated for each user. The control section 11, first, generates an image representing the document information to be provided (S21). The control section 11 sequentially selects the concealment identifiers included in the application list (S22). Then, the control section 11 reads coordinate information (X) associated with the selected concealment identifier with reference to the concealment region specification information (FIG. 4) (S23). Then, the control section 11 draws a predetermined image (for example, an image consisting of a single black color) to conceal a region specified by the read coordinate information (X), in the image generated in the process S21 (S24). If there is plural concealment regions associated with the concealment identifier, all the plural concealment regions are concealed.

At this moment, the control section 11 may check as to whether or not the selected concealment identifier is included in the user access privilege information associated with the user selected in the process S4. In such a case, if the selected concealment identifier is included in the user access privilege information, the control section 11 may acquire substitution information R, which is to be displayed in the concealed region and which is included in the user access privilege information, and draw an image represented by the substitution information R in the region concealed in the process S24. The control section 11 checks as to whether there is a concealment identifier in the application list which has not been selected (S25). If there remains a concealment identifier that has not been selected, the control section 11 proceeds back to the process S22, selects the concealment identifier that has not been selected, and continues the process.

On the other hand, in the process S25, if there is no concealment identifier that has not been selected, the control section 11 outputs the generated image as the image to be provided corresponding to the user identifier selected in the process S4 (S26). In other words, the control section 11 transmits the generated image to be provided to the user specified by the corresponding user identifier.

Figure 9:
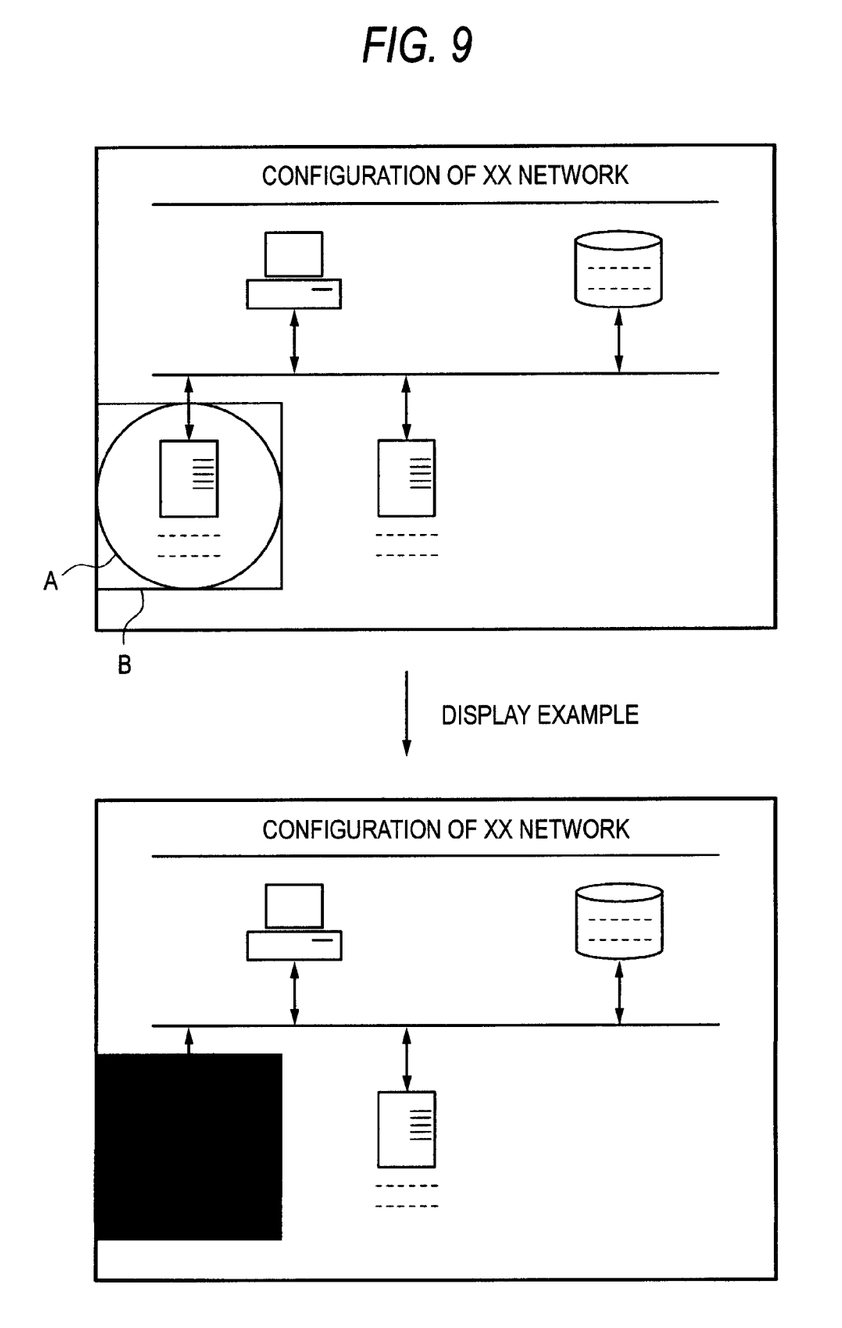
FIG. 9 is a diagram showing an example of concealment region setting screen according to the exemplary embodiment of the invention and a display example of a concealment region set by this method.

Also, the information for specifying concealment regions may be generated as follows. A user inputs a command for displaying document information to be provided. Then, the control section 11 generates an image representing the document information and displays the image (FIG. 9).

The user surrounds a region to be concealed in the displayed image of the document information by using a pointing device such as a mouse as indicated by a circle A. The control section 11 generates a rectangle B that circumscribes the diagram drawn by the user and acquires coordinate information (coordinates of upper left and lower right points of the rectangle, or the like) for specifying the rectangle. At this moment, the control section 11 may combine a translucent image with the area of the acquired rectangle so as to clearly indicate a concealment region.

The control section 11 further issues a unique concealment identifier MID and generates concealment region basic information including (i) the issued concealment identifier and (ii) the document identifier of the displayed document information, and stores the concealment region basic information in the storage section 12. Also, the control section 11 generates concealment region specification information including (i) the issued concealment identifier, (ii) the number of rectangles (the number of concealment regions ANO) acquired by a user's operation, and (iii) the coordinate information (coordinate information for specifying the concealment region X) for specifying the rectangles acquired by the operation, and stores the concealment region specification information in the storage section 12. At this moment, information relating to the substitution information such as a text of "Confidential Information" may be input additionally.

A person, such as a provider-side user or an administrator, responsible for controlling which contents of document information are disclosed to which user refers to the generated information relating to the concealment region. Then, for example, when a certain content should be concealed in units of groups to which users belong, the person includes an identifier(s) of a group(s) in the setting information S of the concealment region basic information. Also, when a certain content should be concealed in units of users, the person includes an concealment identifier(s) of a target user(s) in the user access privilege information of the target user(s). When information relating to the substitution information has been input, the substitution information is stored in the user access privilege information.

In the example shown in FIG. 9, concealment identifier (MID) is assigned to the single rectangle B. However, the invention is not limited thereto. Alternatively, the concealment identifier (MID) may be assigned to plural rectangles (plural concealment regions) as shown in FIG. 4. In this case, in FIG. 9, the user surrounds plural regions to be concealed in the displayed image of the document information by using the pointing device. Then, the control section 11 generates plural rectangles that circumscribe the respective diagrams drawn by the user and acquires plural pieces of coordinate information for specifying the respective rectangles. The control section 11 further issues a unique concealment identifier MID for the plural rectangles. That is, the common concealment identifier MID is assigned to the respective rectangles. The control section 11 generates concealment region specification information including (i) the issued concealment identifier, (ii) the number of plural rectangles (the number of concealment regions ANO), and (iii) the plural pieces of coordinate information (coordinate information for specifying the concealment region X) for specifying the respective rectangles, and stores the thus-generated concealment region specification information in the storage section 12 (see FIG. 4). It is noted that, in this case, plural concealment regions to which the same concealment identifier (MID) is assigned should have the same concealment attribute (indicating concealed or visible) for each user. Specifically, if a certain concealment region P1 having a concealment identifier MID1 is set to be concealed from a user U1, the other concealment regions P1 having the same concealment identifier MID1 are also set to be concealed from the user U1. If a certain concealment region q1 having a concealment identifier MID2 is set to be visible to a user U2, the other concealment regions Qi having the same concealment identifier MID2 are also set to be visible to the user U2.

In the above description, it is assumed that a concealment region specifies a concealed portion of an image represented by document information. However, the invention is not limited thereto. For example, a concealment region may include information for specifying a non-concealment region. In other words, information for specifying a concealment region (concealment region specification information) may include information for specifying a non-concealment region, in addition to information representing a concealment region or instead of the information representing the concealment region. In such a case, the person responsible for setting the concealment regions sets whether concealment region specification information of each concealment region represents a concealment region or a non-concealment region. At this moment, the storage section 12 stores concealment region specification information that includes information indicating a concealment region or a non-concealment region.

As described above, when the non-concealment region is generated, the control section 11 generates a predetermined mask image (for example, an image consisting of a single black color) having the same size as the image of the document information in the process of generating the image to be provided. Then, the control section 11 reads a concealment identifier, which is associated with coordinate information for specifying non-concealment regions, of the concealment identifiers included in the application list and sets regions of the mask image, which are represented by the read coordinate information, as "transparent" portions. When a concealment identifier relating to coordinate information for specifying a concealment region is included in the application list, the control section 11 reads the coordinate information, and draws a predetermined image (for example, an image consisting of a single black color) in a region represented by the read coordinate information for concealment.

Then, the control section 11 generates an image to be provided that only represents regions of the generated document information image corresponding to the regions of the mask image which are set as "transparent." This process of concealing a part of an image by using the mask image is widely known as a so-called alpha blending process. Thus, a detailed description thereof is omitted here. Furthermore, the process described here is not limited to the alpha blending process.

With the information processing apparatus 1 according to this exemplary embodiment, when a user to be provided with document information logins and is to receive the document information, a concealing process is performed for the document information in accordance with a condition that is set for the logged-in user in advance is performed, without a provider-side user performing any operation at that time. In other words, for example, in a conference, if document information has provided and even if there is a user who participates in the conference in the middle of the conference, document information that is at least partially concealed or document information that is not concealed is provided on the basis of the condition set for such a user without any particular operation being requiring for such a user.

In addition, the information for specifying the concealment regions may be generated while the document information is being provided. In such a case, when coordinate information of a concealment region is generated, the control section 11 may present a list of logged-in users (users represented by user identifiers included in the information for specifying recipients) at that moment to a person in charge of a setting operation such as a provider-side user. In such a case, the person in charge of the setting operation selects, from the list, users from whom concealment regions should be concealed. Then, the control section 11 conceals the newly set concealment regions in the images provided for the selected users. In this case, the information of the concealment regions may be information for specifying non-concealment regions instead of the information for specifying the concealment region. In such a case, the control section 11 controls such that the newly set concealment regions of the images provided for the selected users are not concealed.

In addition, when the control section 11 provides an image that can be seen simultaneously by plural users, through a projector 3, the control section 11 acquires a list of users (users represented by user identifiers included in the information for specifying recipients) currently logged-in at that moment and generates an image (document image that is commonly provided) of document information in which parts to be concealed for all the users included in the list are concealed. For example, a logical sum of mask images generated for the respective users is calculated to generate a synthesized mask image in which parts portions to be concealed by any of the mask images are concealed, and the image of the document information only including parts of the synthesized mask image set to be transparent may be output as a common document image.

The control section 11 may be configured to generate the common document image again, for example, when a user logs in or logs out.

In the descriptions above, the provider-side user provides the document information by using the operation section 13 or the display section 14 of the information processing apparatus 1. However, the provider-side user may control the information processing apparatus 1 by using a personal computer or the like that is separated from the information processing apparatus 1. In such a case, the information processing apparatus 1 operates by receiving a command from the device of the provider-side user.

According to this exemplary embodiment, concealment parts for each user can be changed dynamically.

What is claimed is:

1. An information processing apparatus comprising:
a document information holding unit that stores document information of a document;
a user information holding unit that stores user information of a user;
a concealment region information holding unit that stores concealment region information, wherein the concealment region information includes (i) information that specifies a region of the document that is to be concealed when the document is accessed and (ii) concealment condition information that indicates at least one user that is restricted from viewing the region of the document when the document is accessed;
an information reading unit that reads, from the user information holding unit, the user information of the user when the user requests access to the document;

a generation unit that determines that the region is to be concealed from the user based on the user information and the concealment condition information, and generates a modified document, the modified document including the document information of the document and excluding the region of the document, when the user requests access to the document and when it is determined that the region is to be concealed from the user; and an output unit that outputs the modified document to the user, wherein the region is a portion of the document that is less than the entire document.

2. The information processing apparatus according to claim 1, wherein the generation unit searches the concealment condition information for an identity of the user in the user information, and the generation unit generates the modified document when the identity of the user is found in the concealment condition information.

3. An information processing system comprising:

a document information holding unit that stores document information of a document;

an authentication information holding unit that stores user information of a user and authentication information of the user;

a concealment region information holding unit that stores concealment region information, wherein the concealment region information includes (i) information that specifies a region of the document that is to be concealed when the document is accessed and (ii) concealment condition information that indicates at least one user that is restricted from viewing the region of the document when the document is accessed;

an information reading unit that authenticates a user who requests access to the document, using the authentication information, wherein the information reading unit reads, from the user information holding unit, user the information of the user when the user requests access to the document;

a processor that determines that the region is to be concealed from the user based on the user information and the concealment condition information, and generates a modified document, the modified document including the document information of the document and excluding the region of the document, when the user requests access to the document and when it is determined that the region is to be concealed from the user; and an output unit that outputs the modified document to the user, wherein the region is a portion of the document that is less than the entire document.

4. A non-transitory computer-readable medium storing a program, the program causing a computer to execute information processing, the information processing comprising:

storing document information of a document;

storing concealment region information, wherein the concealment region information includes (i) information that specifies a region of the document that is to be concealed when the document is accessed and (ii) concealment condition information that indicates at least one user that is restricted from viewing the region of the document when the document is accessed;

reading user information of a user when the user requests access to a document;

determining that a region of the document is to be concealed from the user based on the user information and the concealment condition information;

generating a modified document, the modified document including the document information of the document and excluding the region of the document, when the user requests access to the document and when it is determined that the region is to be concealed from the user; and outputting the modified document, wherein the region is a portion of the document that is less than the entire document.

\* \* \* \* \*